United States Patent
Van Den Broek et al.

(10) Patent No.: US 6,529,116 B2
(45) Date of Patent: Mar. 4, 2003

(54) PASSIVE COMPONENT

(75) Inventors: Jan Johannes Van Den Broek, Eindhoven (NL); Arjen Boogaard, Eindhoven (NL); Richard Antonius Fransiscus Van Der Rijt, Eindhoven (NL); Martinus Hermanus Wilhelmus Maria Van Delden, Eindhoven (NL); Willem Reindert De Wild, NuenenEindhoven (NL); Andreas Hubertus Montree, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/867,896

(22) Filed: May 30, 2001

(65) Prior Publication Data
US 2002/0036334 A1 Mar. 28, 2002

(30) Foreign Application Priority Data
Jun. 2, 2000 (EP) .............................. 00201953

(51) Int. Cl.$^7$ .............................. H01L 1/012
(52) U.S. Cl. .................. 338/309; 338/307; 338/195
(58) Field of Search ................ 338/309, 195, 338/308, 307

(56) References Cited

U.S. PATENT DOCUMENTS

| 4,839,708 A | * | 6/1989 | Kano et al. ................. 338/2 |
| 5,102,470 A | * | 4/1992 | Kodato et al. ............. 136/225 |
| 5,363,084 A | * | 11/1994 | Swinehart .................. 338/308 |
| 5,370,458 A | * | 12/1994 | Goff ........................ 374/122 |
| 5,453,727 A | * | 9/1995 | Shibasaki et al. ......... 338/32 R |
| 2001/0043550 A1 | * | 11/2001 | Kim et al. ................. 369/126 |

FOREIGN PATENT DOCUMENTS

| DE | 3039236 A1 | 5/1982 |
| DE | 19953299 | 5/2000 |

OTHER PUBLICATIONS

Jiee et al. JP06349847 abstract (Dec. 1994).*
Japanese Abstract Publication No. 57057140, Publication Date Apr. 23, 1982, "Crystalline–Amorhphous Composite Material and its Manufacture".
Green et al., IBM Techn. Disc. Bull. 24 (1982), p. 5466.
Catalina et al., Thin Solid Films 167 (1988), pp. 57–65.

* cited by examiner

*Primary Examiner*—Karl D. Easthom

(57) ABSTRACT

The passive component (1) has a first part (22) of a material with a first resistance value, which value can be lowered to a second value by laser trimming. The second value is at most one tenth of the first value and preferably less. The material crystallizes in a laser trimming process, which locally heats the material to at least a transition temperature. The material contains at least two different elements, which are preferably aluminum and germanium.

The passive component (1) may be, for example, a resistor or a capacitor and may be part of a thin-film network of resistors, capacitors and/or inductors. In a resistor, it is preferred to have a second part (4) which contains a different resistance material with a resistance value lower than the first value and preferably higher than the second value.

15 Claims, 6 Drawing Sheets

PASSIVE COMPONENT

BACKGROUND OF THE INVENTION

1. The Field of the Invention

The invention relates to a passive component comprising a first track of a first material which is built up from at least a first and a second atom type and which knows a first and a second state.

2. Description of the Related Art

Such a component is known from Green et al., *IBM Techn. Disc. Bull.* 24 (1982), 5466. The known component is a resistor which has a substrate with a patterned layer of $Si_{72}Cr_{28}$, the indices indicating atom percents. The resistivity of this material is reduced by 40 to 50% through heating. A disadvantage of the known component is that the value cannot be substantially continuously adjusted over a range of at least a factor five.

SUMMARY OF THE INVENTION

It is an object of the invention to provide a passive component which has a continuously adjustable value. The object is achieved in that a first material has a first atom type and a second atom type, wherein the first material in a first state has an amorphous structure, the first material in a second state has a crystalline structure, and the second atom type is chosen from the group of gallium and germanium.

In the passive component according to the invention, the first material in the second state has a resistivity which is at least ten times, and preferably more than 1000 times lower than in the first state. In addition, the first material knows states with different structures which are each stable. A first portion of the first track is brought to at least a transition temperature through local heating, at which temperature the first material in the first portion crystallizes. Said first portion is smaller or greater in dependence on the value to which the component is to be adjusted. The value of the component is substantially continuously adjustable thereby. The value is in addition adjustable over a range equal to a factor five.

It was surprisingly found in experiments which led to the invention that the first atom type of the first material may be chosen from among various atom types, and that the second atom type may be chosen to be gallium, germanium, and indium—also referred to as Ga, Ge, and In, respectively. Preferably, the proportion of the second atom type in the first material is at least 10%. Examples of first materials are Al—Ge, Ge—Te, Ga—Sb, and In—Sb. If silicon is chosen as the second atom type, a slight drop in the resistivity was found, such as in the case of Cr—Si, or the first state is found to be not stable, such as in the case of Al—Si.

It may be that the first material comprises a third atom type. The inclusion of the third atom type in the first material renders it possible to increase the resistivity in the first state.

Heating to at least the transition temperature may be achieved inter alia by means of an electron beam, a needle-shaped heating source, a focused light beam, and a laser beam. The transition temperature generally lies between 100 and 400° C., depending on the composition of the first material. Heating is preferably performed in that the layer is locally irradiated with a laser beam. The use of a laser beam has among its advantages that dimensions of patterns can be small. Moreover, a laser beam is a known tool, and laser ablation of the first material is also possible with a laser beam.

It is a first advantage of the component according to the invention that the value of the passive component according to the invention may be adjusted also after the manufacture of the component. This is advantageous because the value of the passive component can thus be adapted to the circumstances in which the component is used.

It is a second advantage of the component according to the invention that portions of the first layer can be easily removed. Removal may take place, for example, through local heating, for example with a laser beam. The possibility of removing portions of the first layer has among its advantages that the value of the component can be restored to its original value again. As a result of this, the component may be used, for example, as a potentiometer. The removal possibility has the further advantage that, should the value have been inadvertently adjusted to a value below the desired value, this value can be corrected in upward direction again. The component would have become useless without this possibility.

It is favorable when the first atom type is aluminum and the second atom type is germanium, and the first material has a germanium content of at least 20%. The aluminum-germanium material in the second state has a dual-phase, crystalline structure; separation of the aluminum and the germanium takes place upon crystallization. It was found from experiments that the difference in resistivity between the first and the second state is very small for a germanium content of less than 20%. Examples of favorable compositions of the aluminum-germanium are shown in Table 1.

A first advantage of aluminum-germanium is that the transition temperature lies between 80 and 320° C. This is a temperature which can be easily achieved by local heating with a laser beam. At the same time, this temperature is sufficiently high for preventing a transition from the amorphous to the crystalline state under the influence of ambient factors. A second advantage of aluminum-germanium is that the ratio between the resistivity in the amorphous state and the resistivity in the crystalline state is usually more than $10^3$. A third advantage of aluminum-germanium is that the atom types aluminum and germanium are non-toxic and are accepted in clean-room conditions.

The aluminum-germanium material is known from Catalina et al., *Thin Solid Films* 167 (1988), 57–65. This article, however, does not show or suggest the use of the material in a passive component, neither as a resistor, nor as a capacitor or as an integrated passive component. The article contains no suggestion for local heating of the material.

Alternatively, the first atom type is antimony. This is also referred to as Sb hereinafter. There are various first materials with antimony as the first atom type, such as Ga—Sb and Ge—Sb—Te. The resistivity in the first state is high in these materials. In addition, the difference in resistivity between the first and the second state is satisfactory to great, i.e. from approximately a factor of $10^4$ to $10^6$. The value of the component can be adjusted over a wide range by means of this difference in resistivity. It is a further advantage of antimony as the first atom type that the first material can be restored from the second state to the first state. The first material will melt when irradiated with high-intensity laser light on a small surface area. The released heat diffuses so quickly then that the first material returns to the first state. Resistivity ratios between the first, amorphous state and the second, crystalline state are given in Table 1 for various materials.

In an embodiment of the passive component according to the invention, the first track is present on a first side of a layer of dielectric material, on a second side of which an electrode is situated. The passive component in this embodiment is a capacitor with a trimmable capacitance. The first track then constitutes or forms part of a second electrode, in as far as the first material is in the second state in the first track. The second electrode may comprise a strip of electrically conducting material. A transition from the first to the second state achieved in the first track will enlarge the surface area of the second electrode, so that the capacitor will have a higher capacitance.

In a first, more specific embodiment, the first track is an interconnect between a first and a second strip of electrically conducting material. Preferably, the first and the second strip have a large surface area as compared with the first track. If the first track is in the first state, it is only the first conductive strip which forms part of the second electrode of the capacitor. An electrically conducting connection between the first and the second strip is made in that the transition from the first to the second state is achieved in the first material. The second strip is connected, whereby the capacitance of the capacitor is increased.

In a second specific embodiment, the first electrode and the second electrode of the capacitor each have finger-type portions which lie side by side. The two electrodes are "interdigitated", such that two mutually opposed sides of a finger-type portion adjoin the dielectric. The capacitance of this electrode can be quickly increased in that one or several finger-type portions of the second electrode comprising the first material is/are heated.

In an alternative embodiment, the passive component according to the invention is a resistor. It is an advantage of this embodiment that the resistance value can be adjusted—or trimmed—while it forms part of an electric circuit in operation. This is favorable for an accurate attunement of the resistance value to the circuit. At the start of trimming of the resistor according to the invention, a weak current flows through the circuit. If the component were trimmable to higher values only, as in conventional trimmable resistors, the current at the start of trimming would be high. This would involve a risk of a component of the circuit being destroyed. This risk is avoided in the component according to the invention used as a resistor.

It is favorable with the use of a passive component according to the invention as a resistor when the first track is present on an electrically insulating substrate on which furthermore a resistance track is present made of a second material with a resistivity lower than that of the first material in its first state, and said first track forms a bridge between a first and a second point on the resistance track.

If only the first material is present, this material will define the resistance value. This has among its disadvantages that the range of resistance values is limited by the properties of the first material and that trimming has to be performed very accurately in order to achieve low resistance values. The presence of a resistance track of a second material electrically parallel to the first track counteracts these disadvantages. The resistance track is short-circuited between the two points in that the first material of the first track is brought into its second state in this embodiment. This effective shortening of the resistance track determines the reduction in the resistance value of the component; the reduction is not primarily determined by the material used and the dimensions of the resistance track, as is the case in the resistance of Green et al.

It is furthermore an advantage of this embodiment that damage and pollution of at least the first track and the resistance track are prevented. Material is burnt away from the first track, thus creating a cut, during trimming in components which are trimmable to higher resistance values in a conventional manner. The cut may expand, whereby the stability of the resistor is affected. It is also possible for the burnt-away material upon its escape to damage a layer which covers the first track. Furthermore, the burnt-away material may deposit on the first track and pollute this track in an uncontrollable manner. These disadvantages are avoided in the embodiment of the passive component according to the invention.

The choice of the second material is one of the determining factors for the range over which the resistance value of the component according to the invention is tunable. If a resistivity of approximately 200 $\mu\Omega$cm is chosen for the resistance track, tungsten-titanium-nitrogen is preferably chosen. The resistance track may be manufactured in a sputtering process in which nitrogen is added to tungsten-titanium. It is an advantage of this material that it need not be annealed for guaranteeing a low temperature dependence of the resistivity. The resistivity of the material has a comparatively low temperature coefficient. As a result of this, it can be provided together with the first material in one sputtering process. In addition, the material is insensitive to the etching liquid with which the first material can be patterned into the first track and any other patterns which may be present. The use of tungsten-titanium-nitrogen and of aluminum-germanium in the resistor according to the invention is furthermore favorable because tungsten-titanium-nitrogen can be etched in an etchant which does not attack aluminum-germanium. Aluminum-germanium can be etched in an etchant which does not attack tungsten-titanium-nitrogen, such as a mixture of iron-trichloride hexahydrate and hydrogen chloride.

If a lower resistance than 200 $\mu\Omega$cm is chosen for the resistance track, CuNi is a suitable second material, having a resistivity value of approximately 40 $\mu\Omega$cm. Again, this material need not be annealed for obtaining a low temperature coefficient. If a higher resistance value is chosen, CrSiN is suitable as a first material, with a resistivity of $2\times10^3$ $\mu\Omega$cm. This material does have to be annealed for obtaining a low temperature coefficient of the resistivity.

In a favorable modification of the embodiment of the passive component according to the invention, the resistance track extends from a first to a second electrode, and the resistance track is substantially meandering in shape. A meandering resistance track has among its advantages that bridges made of the first material may be positioned in a large number of points on the resistance track. Also, a substantially meandering resistance track preferably comprises a first, wider strip of the second material. The passive component can be trimmed to higher resistance values in a conventional manner by means of such a strip, for example in that material is removed with a laser beam.

The resistance can be trimmed stepwise to a lower value if not only a first, but also a second and possibly a third bridge comprising the first material is/are provided between several loops of the meandering resistance track. In an advantageous modification of the embodiment of the component according to the invention, a bridge comprising the first material is present between a third and a fourth point on the resistance track, which third and fourth point lie between the first and the second point of the resistance track. In this modification, the bridge between the third and the fourth point may be first locally heated, and after that the bridge between the first and the second point, if so desired. The step size of the trimming process is thus reduced, which enhances the accuracy of the adjustability of the value of the component.

In a further modification of the embodiment of the passive component according to the invention, the resistance track has the shape of a loop between a fifth and a sixth point. The resistance track thus comprises a first region which is substantially covered by a layer of the first material. Such a loop may have, for example, a V-shape, a U-shape, a hairpin shape, or form the arc of a circle or oval. The value can be trimmed over a continuous scale in this modification.

Preferably, the first track has the shape of a narrow strip which is narrower than the laser beam to be used for the local heating. This shape is obtained in that a layer of the first material is provided and this layer is subsequently patterned by etching. If the ratio of the resistivity values of the first material in the first and the second state is above 1000, it is not necessary to pattern the first layer. The leakage current through the first material in its first state can be small then. It may be favorable that first the, possibly patterned, layer of the first material is present on the substrate, with the resistance track of the second material disposed thereon.

The passive component according to the invention may furthermore be included in a network of passive components. Such a network of passive components is also known as a thin-film module and is described in the application EP1024535 (not-published), which is deemed to be included in the present application by reference. A thin-film module is suitable, for example, for improving the signal-to-noise ratio. It is furthermore highly suitable for contactless products and electronic appliances. The integration saves space and expense. It is advantageous also for a thin-film module that the resistance value and/or the capacitance value are still adjustable after the manufacture of the thin-film module has been completed. Thin-film modules often comprise various passive components which are to be attuned to the performance of a specific function. The passive component according to the invention renders it possible for the thin-film module to be corrected after its inclusion in an electric circuit. It is also possible with the passive component according to the invention to correct a possible production error owing to which the value of the module would lie outside the relevant tolerances. This is of especial importance for thin-film modules because of their high cost price.

In a particularly favourable embodiment the passive component is used as a switch in a system of batteries. Such batteries can be Li-ion batteries, for example, and are preferably used in a fuel-cell operated vehicle.

BRIEF DESCRIPTION OF THE DRAWINGS

These and other aspects of the passive component according to the invention will be explained in more detail below with reference to drawings and a few non-limitative embodiments, in which.

DETAILED DESCRIPTION OF THE PRESENT INVENTION

TABLE 1 first materials with their atomic compositions, square resistance values in the first state having an amorphous structure, and ratios of resistivity values in the first and the second state

| no. | material | atom % 1 | Atom % 2 | Substrate | $R_{s,1}$ | $\rho_1/\rho_2$ |
|---|---|---|---|---|---|---|
| 1 | Al–Ge | 91% Al | 9% Ge | Glass | 4, 7 | 2, 2 |
| 2 | Al–Ge | 82% Al | 18% Ge | Glass | 19, 0 | 6, 1 |
| 3 | Al–Ge | 72% Al | 28% Ge | Glass | 900 | 161 |
| 4 | Al–Ge | 60% Al | 40% Ge | $Al_2O_3$ | * | $1, 5.10^4$ |
| 5 | Al–Ge | 50% Al | 50% Ge | $Al_2O_3$ | * | $3, 4.10^4$ |
| 6 | Ge–Sb–Te | 22% Sb | 22% Ge | Glass | $9, 6.10^8$ | $1, 2.10^6$ |
| 7 | Ge–Sb–Te | 28% Sb | 14% Ge | Glass | $3, 0.10^8$ | $5, 0.10^5$ |
| 8 | GeTe | 51% Te | 49% Ge | Glass | $5, 5.10^8$ | $6, 3.10^6$ |
| 9 | Ga–Sb | 50% Sb | 50% Ga | Glass | $1, 8.10^8$ | $9, 0.10^3$ |
| 10 | Al–Ge | 23.4% Al | 76.6% Ge | Glass | $4, 64.10^5$ | $1, 97.10^4$ |
| 11 | Al–Ge | 20.8% Al | 79.2% Ge | Glass | $6, 33.10^5$ | $2, 62.10^4$ |
| 12 | Al–Ge | 17.1% Al | 82.9% Ge | Glass | $1, 19.10^6$ | $3, 81.10^4$ |
| 13 | Al–Ge | 13.7% | 86.3% Ge | Glass | $3, 11.10^{6.}$ | $8, 89.10^4$ |

$R_{s,1}$ = square resistance in the first state measured on a glass substrate, the layer being covered with a layer of $(ZnS)_{80}(SiO_2)_{20}$
* = not measured, $Al_2O_3$ substrate

TABLE 2 transition temperature as a function of composition

| composition (atom %) | substrate | $\rho_1/\rho_2$ | $T_x$(° C.) |
|---|---|---|---|
| $Al_{50}Ge_{50}$ | $Al_2O_3$ | $3.10^4$ | 150 |
| $Al_{55}Ge_{45}$ | $Al_2O_3$ | $>10^4$ | 160 |
| $Al_{59}Ge_{41}$ | glass | $>10^4$ | 210 |
| $Al_{60}Ge_{40}$ | $Al_2O_3$ | $2.10^4$ | 220 |
| $Al_{70}Ge_{30}$ | $Al_2O_3$ | $\sim 10^3$ | 120 |
| $Al_{70}Ge_{30}$ | glass | $5.10^3$ | 150 |
| $Ge_2Sb_2Te_5$ | $Al_2O_3$ | $5 \times 10^4$ | 180 |
| $Al_{91}Ge_9$ | glass | 2, 2 | 80 |
| $Al_{34}Ge_{66}$ | glass | $2, 1.10^4$ | 225 |
| $Al_{17}Ge_{83}$ | glass | $3, 8.10^4$ | 250 |
| $Al_8Ge_{92}$ | glass | $2, 6.10^4$ | 320 |

Figure 1:
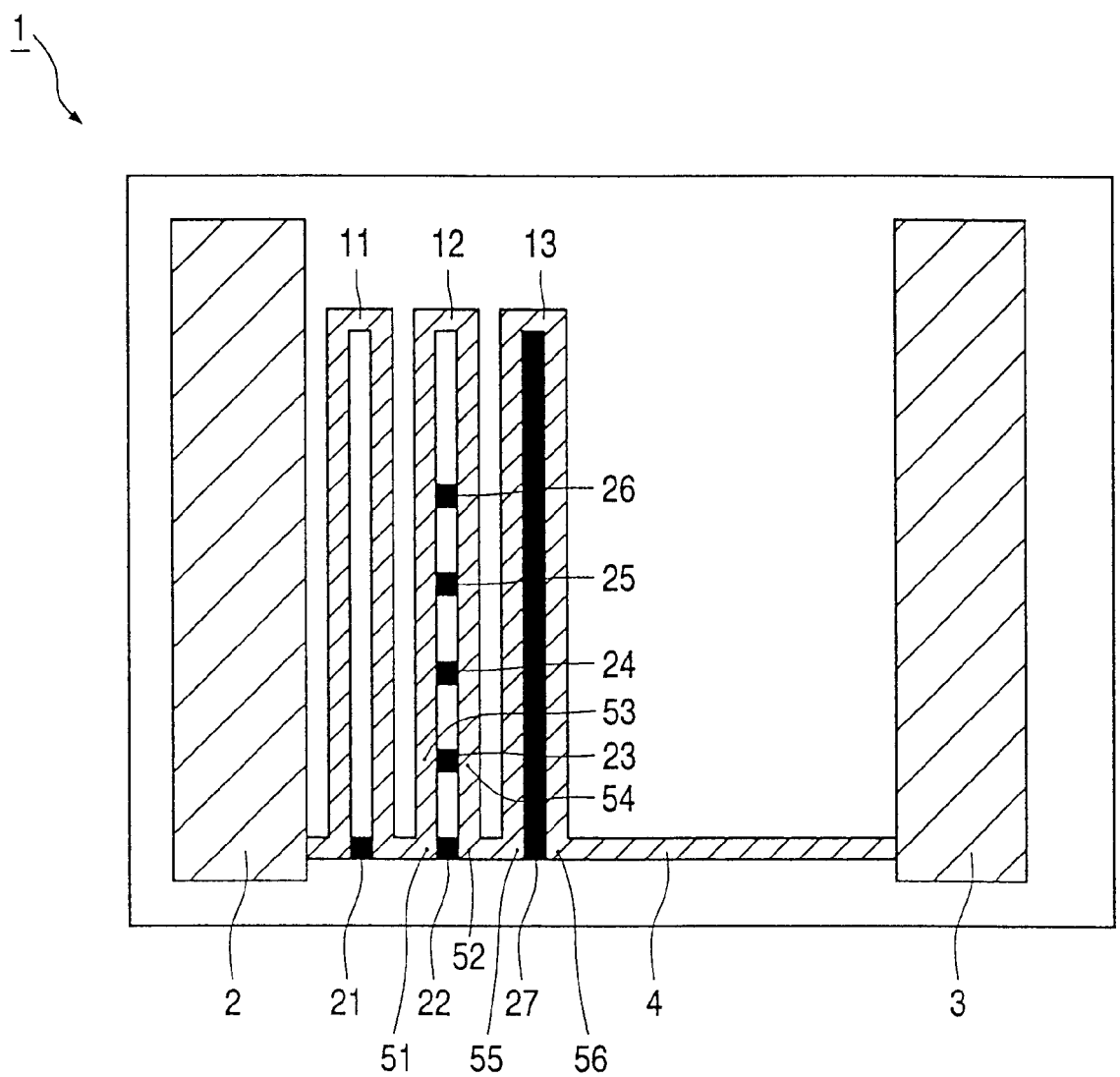
FIG. 1 is a diagrammatic plan view of a first embodiment of the passive component according to the invention.

FIG. 1 is a diagrammatic plan view of the resistor 1. This resistor 1 comprises contacts 2 and 3 of Al, a resistance track 4 of the resistance material W—Ti—N, and Al—Ge tracks 21, 22, 23, 24, 25, 26, 27. The resistor is manufactured as follows: 50 nm $Al_{60}Ge_{40}$ and 20 nm $W_{70}Ti_{10}N_{20}$ are provided in that order on an $Al_2O_3$ substrate by means of sputter deposition. The W—Ti—N is patterned, a positive photoresist being used as the etching mask. The uncovered W—Ti—N is etched in a buffered hydrogen peroxide etchant. The result is a pattern of W—Ti—N which forms a meandering resistance track 4 comprising three loops 11, 12, 13. Then the $Al_{60}$Ge40 is patterned. A positive photoresist is again used as the etching mask. The $Al_{60}Ge_{40}$ is selectively removed in the regions between the loops 11, 12, and 13 of the meandering resistance track 4. The first loop 11 comprises a first bridge 21. The second loop 12 comprises five tracks 22, 23, 24, 25, and 26. The third loop 13 comprises a region which is covered by a track 27. The first track 22 is present between the first point 51 and the second point 52. The track 23 is the second bridge which is present between a third point 53 and a fourth point 54. The track 27 is a first region which lies in the loop 13 between a fifth point 55 and a sixth point 56. Subsequently, two electrical contacts 2 and 3 formed by Al contact pads are provided at the ends of the resistance track 4 of W—Ti—N.

The resistor thus formed, which can be trimmed to lower resistance values, is subsequently trimmed with a laser. A Nd—Y—Ag laser with a maximum power of 4 W is used. The power density of the laser is $3.2 \times 10^4$ W/cm$^2$. A strip is irradiated with light having a wavelength of 532 mn and a pulse frequency of 2 to 6 Hz such that the pulse energy is 1.5 mJ. The beam diameter of the laser is adjustable between 14 $\mu$m and 9 mm. An amorphous strip of $Al_{60}Ge_{40}$ has a resistance value of 3 M$\Omega$. Upon the application of a laser current strength of 19 A, the resistance value of the strip starts to drop. When the current is increased to 20.5 A, the resistance value drops to 4 k$\Omega$. Trimming is stopped at this value. This resistance value corresponds to a resistivity of 500 m$\Omega$cm.

Figure 2:
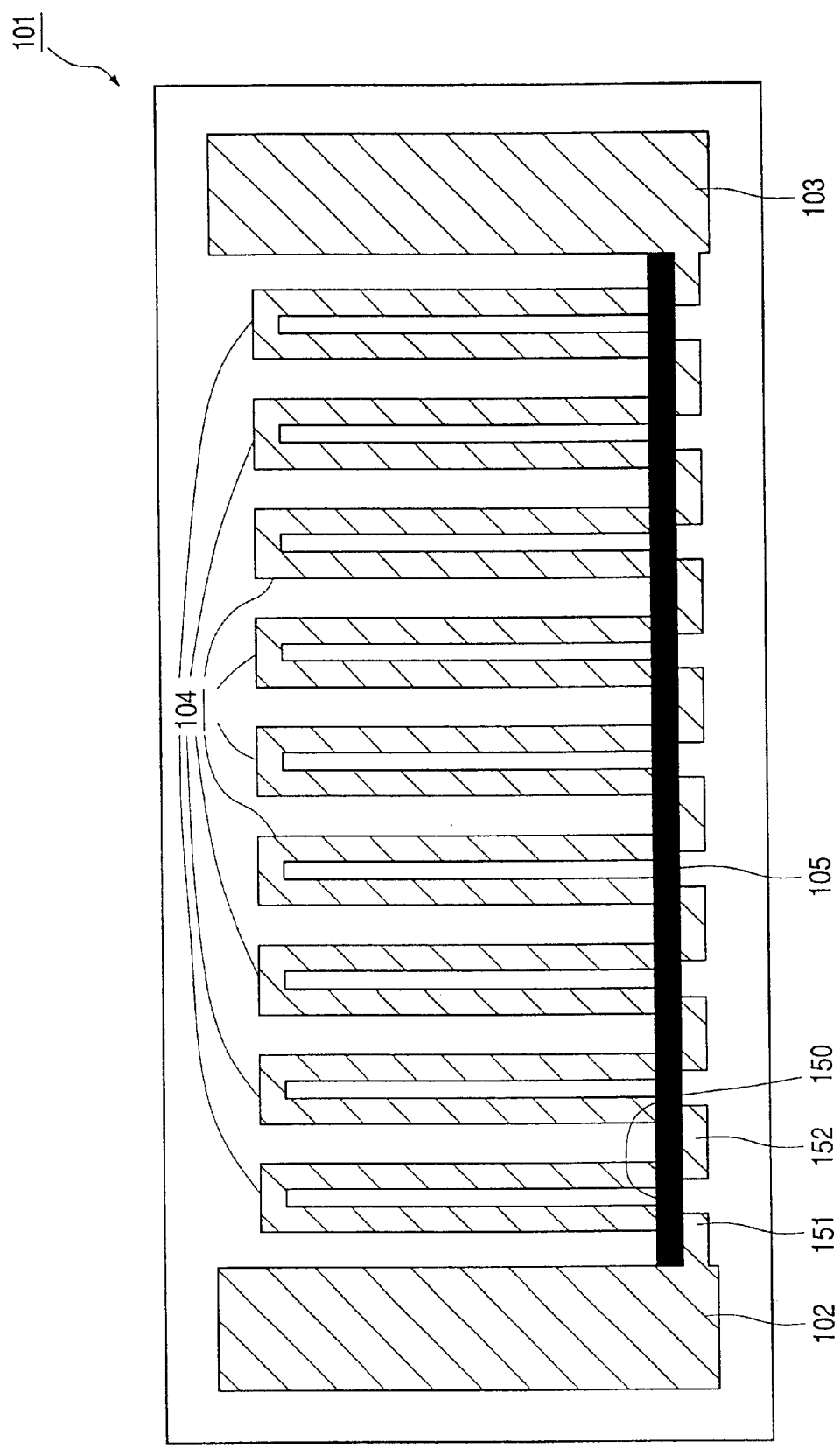
FIG. 2 is a diagrammatic plan view of a second embodiment of the passive component according to the invention.

FIG. 2 is a diagrammatic plan view of the resistor 101. The resistor 101 comprises contacts 102 and 103 of Al, a first track 105 of Al—Ge, and a resistance track 104 of W—Ti—N. An electrically conducting bridge is formed between a first point 151 and a second point 152 after local heating of the first track 105 at point 150.

The resistor 101 is manufactured as follows: 20 nm W—Ti—N is provided on an $Al_2O_3$ substrate by means of sputter deposition. The W—Ti—N is patterned, for which a positive photoresist is used as the etching mask. The result is a pattern of W—Ti—N which forms a meandering resistance track 104 with nine loops and with a contact at either end. Then a strip-shaped layer of $Al_{60}Ge_{40}$ is provided over the resistance meander. The substrate is covered with a metal mask for this purpose. A slit is present in this mask which is long enough for spanning the subjacent contacts 102, 103 at the two ends of the meandering resistance track 104. The slit has a width which is equal to or greater than the width of the subjacent resistance track 104. The slit in the mask is positioned such that it renders visible the lowermost horizontal portions of the resistance track 104. Subsequently, 50 nm $Al_{60}Ge_{40}$ is deposited by sputtering, whereupon the metal mask is removed. A strip-shaped first track 105 of $Al_{60}Ge_{20}$ is thus provided across the resistance track 104.

The resistor 101 thus shaped, which can be trimmed to lower resistance values, is subsequently trimmed with a laser. A ND—Y—Ag laser with a maximum power of 4 W is used. The power density of the laser is $3.2 \times 10^4$ W/cm$^2$. Irradiation takes place with light having a wavelength of 532 nm and a pulse frequency of 2 to 6 Hz, such that the pulse energy is 1.5 mJ. The beam diameter of the laser is adjustable between 14 $\mu$m and 9 mm. The square resistance value of the amorphous $Al_{60}Ge40$ is 220,000$\Omega$. The square resistance value of the $Al_{60}Ge_{40}$ drops to approximately 20$\Omega$ upon switching-on of a laser current strength of 16 A. The first track 105 of Al—Ge is trimmed at the open side of one of the loops of the meander. The meander loop is short-circuited thereby, and the total resistance of the resistor 101 drops approximately by the resistance value of the short-circuited loop. All nine meander loops can be short-circuited in this manner.

Figure 3:
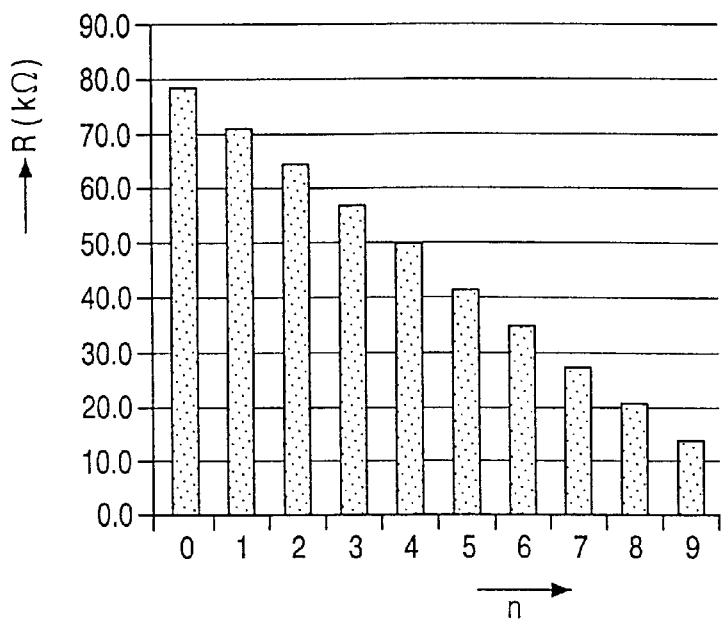
FIG. 3 is a diagram showing the drop in resistance value owing to trimming of the first track in the second embodiment of the passive component according to the invention.

FIG. 3 shows the drop of the resistance value R of the resistor 101 with the meandering second track 104 as a function of the number of loops N in the meandering second track 104 which were short-circuited by the method described above.

Figure 4:
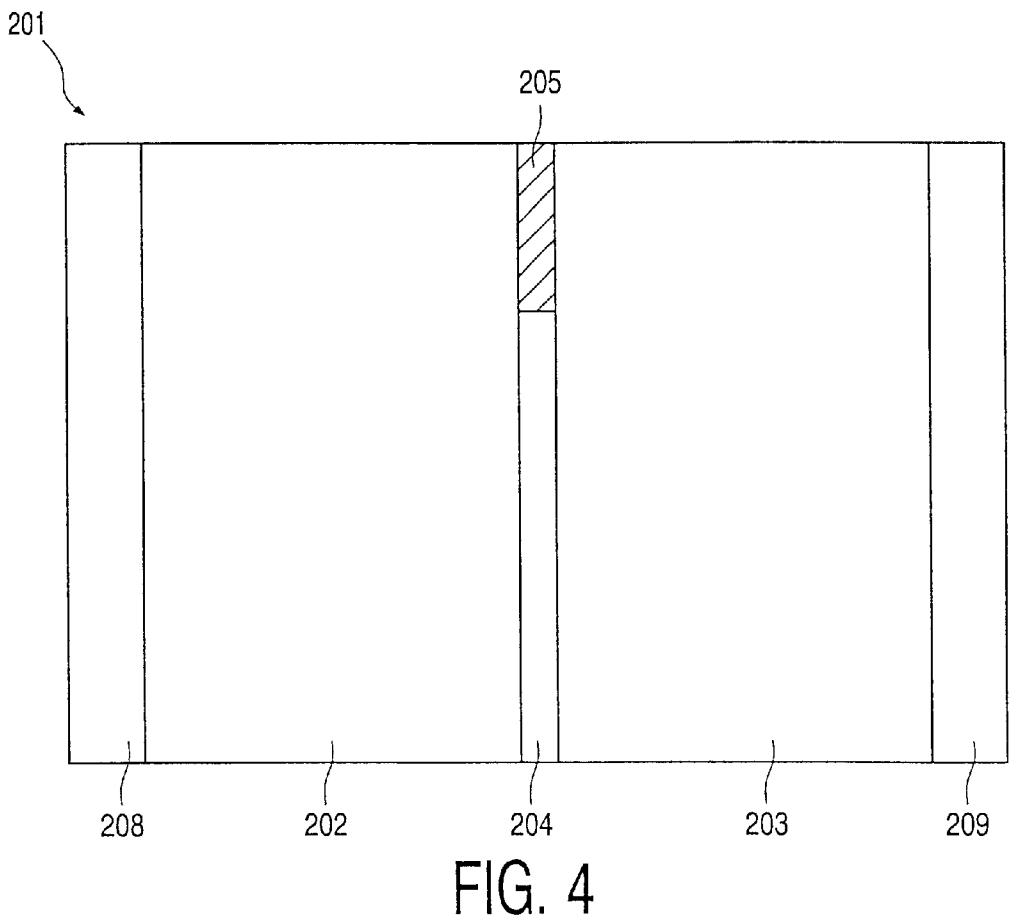
FIG. 4 is a diagrammatic plan view of a third embodiment of the passive component according to the invention.

FIG. 4 is a plan view of the resistor 201. This resistor 201 comprises contacts 202 and 203 of W—Ti—N and a first track 204 of $Al_{50}Ge_{50}$. The contacts 202 and 203 are bounded by gold tracks 208, 209. The first track 204 has a thickness of 50 nm, a length from the first 202 to the second contact 203 of 100 $\mu$m, and a width perpendicular to the length of 2 mm.

Figure 5:
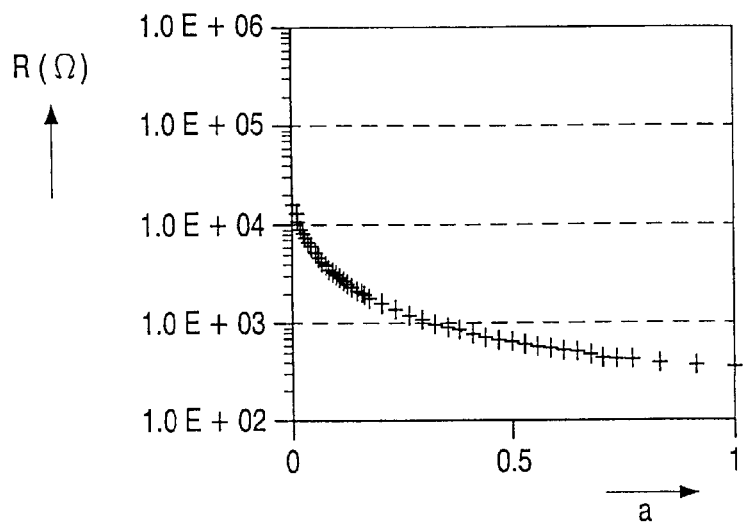
FIG. 5 is a graph showing the resistance in the component of FIG. 4 as a function of the fraction of the Al—Ge track converted from the first to the second state.

FIG. 5 shows the decrease in the resistance value of the resistor 201. The fraction a of the first track which is in the crystalline state is plotted on the x-axis. The resistance value of the resistor 201 is plotted on the y-axis. If the first track 204 is entirely in the amorphous state, the resistor 201 has a resistance value of $2.0 \times 10^4 \Omega$. It is advantageous, however, if a portion 205 of the first track 204 is converted from the amorphous to the crystalline state immediately after manufacture already. In this example, said portion 205 has a width of approximately 100 $\mu$m. Accordingly, the resistance value is $1.7 \times 10^3 \Omega$ at the start of trimming of the resistor 201. During trimming of the resistor 201, the first track 204 is locally heated over its entire length by means of a laser, while the resistance value between the contacts is being measured. A spot width of the laser of the order of the length of the first track 204 is chosen for this, i.e. 100 $\mu$m in the present example. Trimming is stopped the moment a desired resistance value is achieved. The resistance value will be 350$\Omega$ if the first track 204 is trimmed over its entire width.

Figure 6:
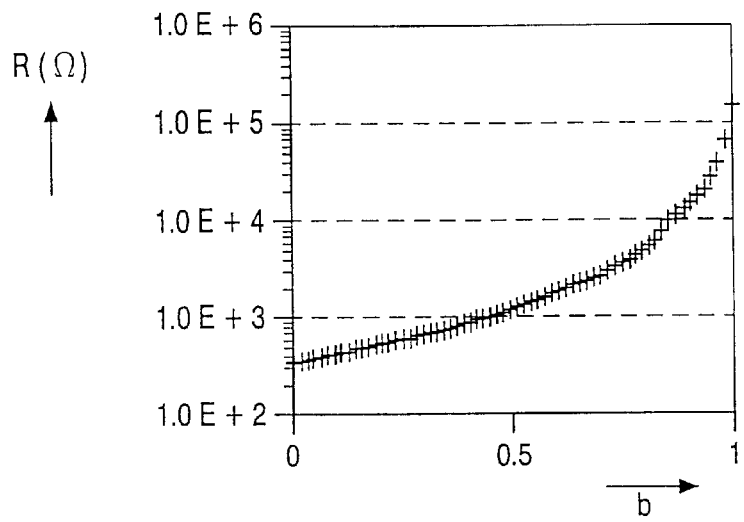
FIG. 6 is a graph sowing the resistance in the component of FIG. 4 as a function of the fraction of the Al—Ge track which was removed.

FIG. 6 shows the increase in the resistance value of the resistor 201. The fraction b of the first track removed through laser ablation is plotted on the x-axis. The resistance value of the resistor 201 is plotted on the y-axis. Laser ablation takes place in that the laser intensity is increased. Thus the resistance value can be trimmed in upward direction by approximately a factor 100; from 350$\Omega$ up to a maximum of $3.0 \times 10^4 \Omega$, or from the initial value of $2.0 \times 10^4 \Omega$ up to approximately $1.0 \times 10^6 \Omega$; or, for example, from $2.0 \times 10^3 \Omega$ up to $1.0 \times 10^4 \Omega$, whereupon the resistor can be trimmed down once more to approximately $2.0 \times 10^3 \Omega$ for an alternative application. The resistor 201 is thus highly suitable for use as a potentiometer.

Figure 7:
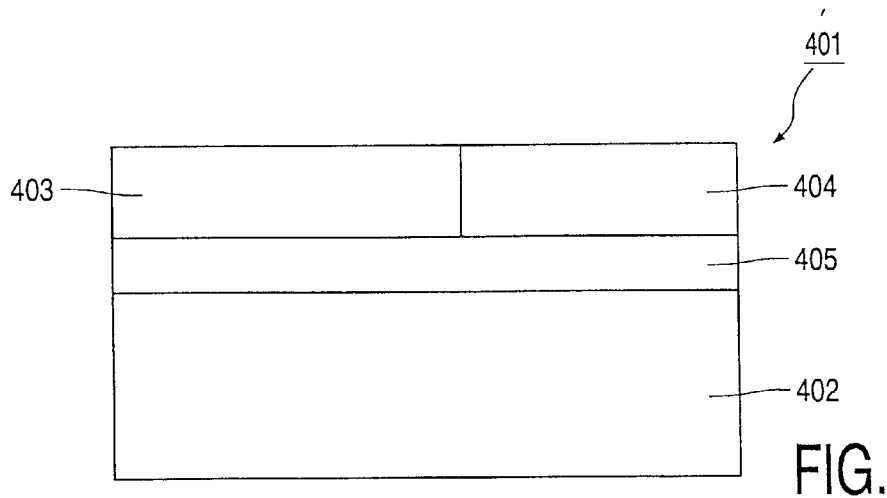
FIG. 7 is a diagrammatic plan view of a fourth embodiment of the passive component according to the invention.

FIG. 7 is a diagrammatic cross-sectional view of the trimmable capacitor 401. The capacitor 401 comprises a first electrode 402 of Al, a first dielectric 405, a first track 404 of $Al_{70}Ge_{30}$, and a strip 403 of the electrically conducting material Al. The strip 403 and the first track 404, in as far as it is in the crystalline state, together form the second electrode of the capacitor 401. The first electrode 402 has a thickness of 0.5 $\mu$m and a width of 1 mm, and a length (not shown) of 0.5 mm. The first dielectric 405 comprises the material $SiN_x$, with x being approximately equal to 1.5. This material may be applied in a simple manner in a plasma-enhanced chemical vapor deposition (PECVD) process. The first dielectric 405 in this example has a thickness of 0.5 $\mu$m. This thickness is variable over a wide range, for example from 200 nm to 2 $\mu$m. The strip 403 has a thickness of 0.5 $\mu$m, and the thickness of the first track 404 in this example is approximately 250 nm. The width of the strip 403 is 0.2 mm, and the width of the first track 404 is 0.8 mm. Previous to trimming, the first track 404 is entirely in the amorphous state. The capacitance of the capacitor is 550 pF then. This capacitance is 92 pF after completion of the trimming process.

Figure 8:
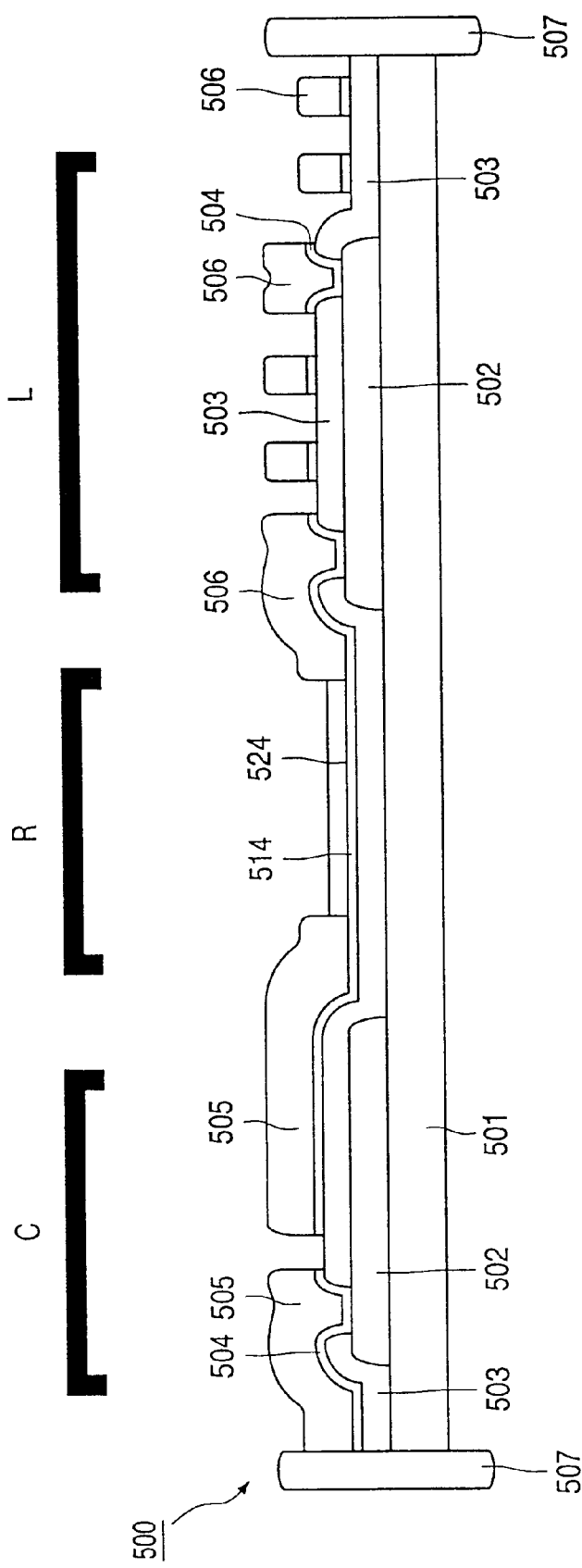
FIG. 8 is a diagrammatic cross-sectional view of a fifth embodiment of the passive component according to the invention.

FIG. 8 shows a fifth embodiment of the passive component according to the invention, a thin-film module 500. This module 500 comprises a TiO$_2$ planarizing layer on a glass substrate 501. A first electrically conducting layer 502 of Ti/Pt is deposited thereon and structured. Then a dielectric 503 of PbZr$_x$Ti$_{1-x}$O$_3$ (0≦x ≦1) is deposited over the entire surface area of the substrate 501 and structured. A resistance layer 504 consisting of Ti$_x$W$_y$N$_z$ (0≦x ≦1, 0≦y ≦1, 0≦z≦1) is provided on the dielectric 503. The resistance layer 504 is structured by means of etching with hydrogen peroxide into a resistance track 514 which comprises a number of loops and a number of surfaces. A first track 524 of Al$_{60}$Ge$_{40}$ is deposited on the resistance track 514 by means of a mask having a slit-shaped opening, which track is similar to the one formed in embodiment 2. Deposition takes place in a sputtering process from a first source of Al and a second source of Ge. Then the Ge source is switched off and the mask having the slit-shaped opening is removed. A second electrically conducting and structured layer 505 of Al is present on the strip of AlGe. The thin-film module 500 is provided with a protective layer 506 of Si$_3$N$_4$ and polyimide, and furthermore with surface mounted device (SMD) end contacts 507 fastened for the supply of current.

Figure 9:
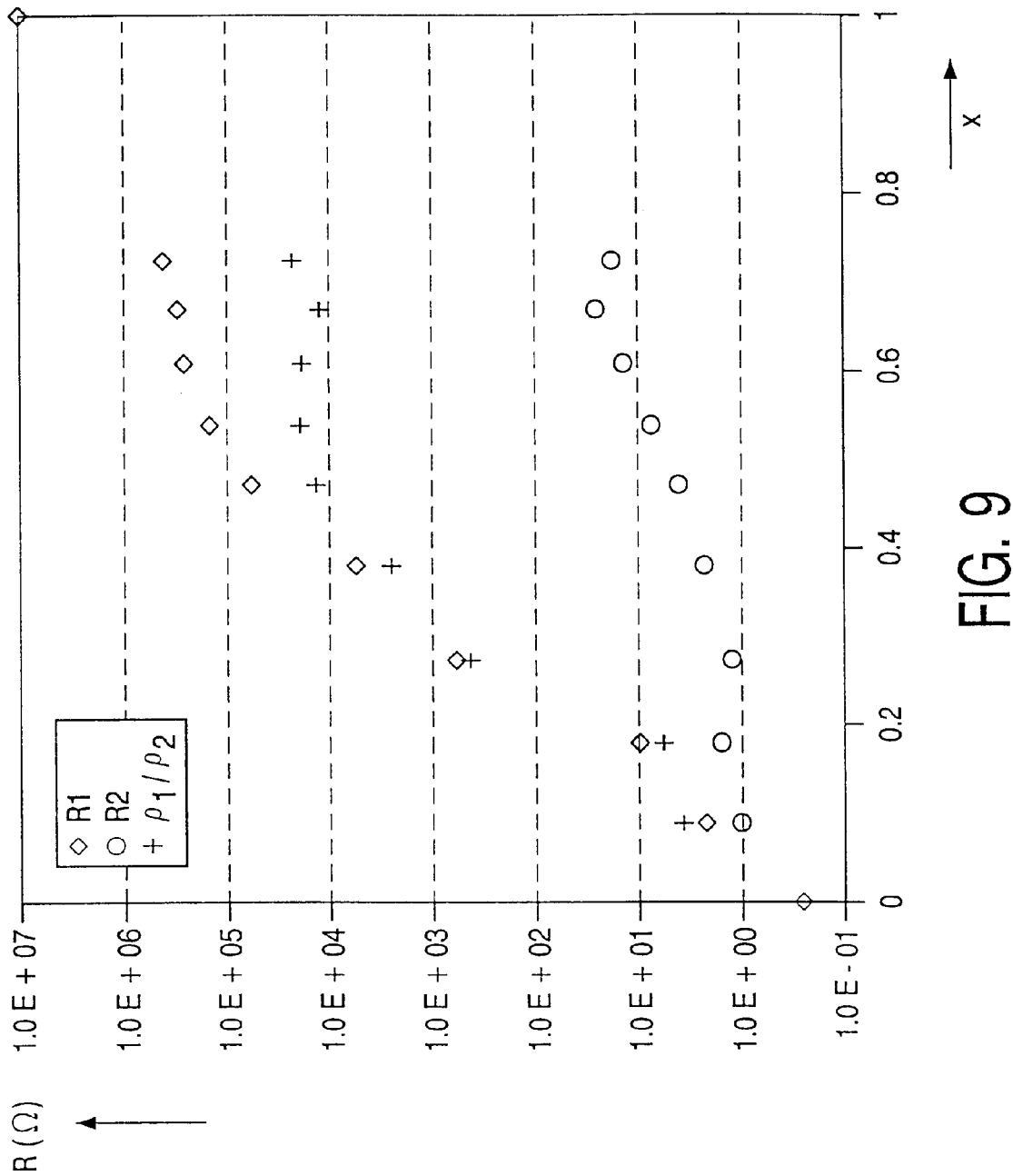
FIG. 9 is a graph showing the square resistance values (in ohms, Ω) in the first state $R_1$ and in the second state $R_2$ (100 nm thick layers, glass substrate) and the ratio $\rho_1/\rho_2$ of resistivity values $\rho_1$ in the first state and $\rho_2$ in the second state as a function of the molar fraction of Ge in Al—Ge.

FIG. 9 is a graph in which a number of relevant values of the Al—Ge are plotted as a function of the molar fraction of Ge in Al—Ge, referenced x: i.e. the square resistance values (in ohms, Ω) in the first state R$_1$ with an amorphous structure and in the second state R$_2$ with a crystalline structure, and the ratio $\rho_1/\rho_2$ of the resistivity values $\rho_1$ in the first state and $\rho_2$ in the second state. The square resistance values were measured for 100 nm thick layers of Al$_{1-x}$Ge$_x$ on a glass substrate. As is apparent, the square resistance rises strongly with the molar fraction x in the first state. The square resistance is approximately five decades greater for x=0.6 than for x=0.1. The square resistance in the second state rises to a limited degree only with the molar fraction x, at least over the range from 0.1<x<0.6. At x =0.6, the square resistance in the second state is approximately one decade greater than at x=0.1. The ratio R$_1$/R$_2$ of these square resistance values is equal to the ratio $\rho_1/\rho_2$ of the resistivities $\rho_1$ in the first state and $\rho_2$ in the second state. It is apparent from the graph that the material Al—Ge is highly suitable for use in a first layer of a passive component if x is greater than 0.2.

What is claimed is:

1. A passive component, comprising:
   an electrically insulating substrate;
   a first track overlying said substrate, said first track of a first material which is built up from at least a first and a second atom type and which knows a first and a second state,
   wherein said first material in the first state has an amorphous structure, said first material in the second state has a crystalline structure, and the second atom type is chosen from a group of gallium and germanium;
   a first electrode and a second electrode overlying said substrate; and
   a resistive track overlying said substrate and extending from said first electrode to said second electrode, said resistive track of a second material with a resistivity lower than a resistivity of the fist material in the first state.

2. The passive component as claimed in claim 1, wherein the first atom type is aluminum and the second atom type is germanium, and the first material has a germanium content of at least 20%.

3. The passive component as claimed in claim 1, wherein the first atom type is antimony.

4. The passive component as claimed in claim 1,
   wherein a shape of said resistive track defines a loop, and
   wherein said first track is present with said loop between a first point and a second point of said loop.

5. The passive component as claimed in claim 1,
   wherein a shape of said resistive track defines a loop, and
   wherein said first track is present throughout said loop.

6. The passive component as claimed in claim 1, further comprising:
   a second track overlying said substrate, said second track of the first material,
   wherein a shape of said resistive track defines a loop, said first track is present with said loop between a first point and a second point of said loop, and said second track is present with said loop between a third point and a fourth point of said loop.

7. The passive component as claimed in claim 1, further comprising:
   a second track overlying said substrate, said second track of the first material,
   wherein a shape of said resistive track defines a first loop and a second loop, said first track is present with said first loop between a first point and a second point of said first loop, and said second track is present with said second loop between a first point and a second point of said second loop.

8. The passive component as claimed in claim 1, further comprising:
   a second track overlying said substrate, said second track of the first material,
   wherein a shape of said resistive track defines a first loop and a second loop, said first track is present with said first loop between a first point and a second point of said first loop, and said second track is present throughout said second loop.

9. A passive component, comprising:
   an electrically insulating substrate;
   a first track overlying said substrate, said first track of a first material which is built up from at least a first and a second atom type and which knows a first and a second state,
   wherein said first material in the first state has an amorphous structure, said first material in the second state has a crystalline structure, and the second atom type is chosen from a group of gallium and germanium;
   a first electrode and a second electrode overlying said substrate; and
   a resistive track overlying said substrate and extending from said first electrode to said second electrode, a shape of said resistive track defining a first loop,
   wherein said first track is present with said first loop between a first point and a second point of said first loop.

10. The passive component as claimed in claim 9, further comprising:
    a second track overlying said substrate, said second track of the first material,
    wherein said second track is present with said loop between a third point and a fourth point of said first loop.

11. The passive component as claimed in claim 9, further comprising:
    a second track overlying said substrate, said second track of the first material, wherein the shape of said resistive track further defines a second loop, and said second track is present with said second loop between a first point and a second point of said second loop.

12. The passive component as claimed in claim 9, further comprising:

a second track overlying said substrate, said second track of the first material, wherein the shape of said resistive track further defines a second loop, and said second track is present throughout said second loop.

13. A passive component, comprising:

an electrically insulating substrate;

a first track overlying said substrate, said first track of a first material which is built up from at least a first and a second atom type and which knows a first and a second state, wherein said first material in the first state has an amorphous structure, said first material in the second state has a crystalline structure, and the second atom type is chosen from a group of gallium and germanium;

a first electrode and a second electrode overlying said substrate; and a resistive track overlying said substrate and extending from said first electrode to said second electrode, a resistive track overlying said substrate, a shape of said resistive track defining a first loop, wherein said first track is present throughout said first loop.

14. The passive component as claimed in claim 13, further comprising:

a second track overlying said substrate, said second track of the first material, wherein the shape of said resistive track further defines a second loop, and said second track is present with said second loop between a first point and a second point of said second loop.

15. The passive component as claimed in claim 13, further comprising:

a second track overlying said substrate, said second track of the first material, wherein the shape of said resistive track further defines a second loop, and said second track is present throughout said second loop.

* * * * *